United States Patent [19]

Strelioff

[11] Patent Number: 5,369,222
[45] Date of Patent: Nov. 29, 1994

[54] MOBILE WEIGHING SYSTEM

[76] Inventor: William P. Strelioff, Box 3 Site 5 RR6, Saskatoon, Sask., Canada, 57K 3J9

[21] Appl. No.: 64,909
[22] Filed: May 24, 1993
[51] Int. Cl.$^5$ .................... G01G 19/08; G01G 19/02
[52] U.S. Cl. ...................................... 177/136; 177/146
[58] Field of Search ............... 177/136, 137, 138, 146, 177/147

[56] References Cited

U.S. PATENT DOCUMENTS

| | | | |
|---|---|---|---|
| 4,673,048 | 6/1987 | Curran | 177/146 |
| 4,905,780 | 3/1990 | Goff, III | 177/136 |
| 5,315,883 | 5/1994 | Wirth | 177/137 |

Primary Examiner—George H. Miller, Jr.
Attorney, Agent, or Firm—Lynn S. Cassan

[57] ABSTRACT

A mobile weighing system for use on a truck or trailer to weigh a load carried by the truck or trailer. A load support frame supports a load and is positioned over the frame of the truck or trailer. A plurality of weighing cells are mounted over the truck or trailer frame in such a manner as to bear an approximately even distribution of the load. Each weighing cell comprises a lifting mechanism having an extended position and a rest position, a vertically disposed tension load cell and a linkage assembly coupling the lifting mechanism and the load cell to cause an upward force on a top end of the load cell when the lifting mechanism is extended. The bottom end of the load cell is attached to the support frame so that the support frame is suspended by the load cells when the lifting mechanisms are extended. The lifting mechanisms and linkage assemblies of the weighing cells are attached to the truck or trailer frame. A lock down mechanism integral to the load cells secures the load support frame when the lifting mechanism is in a rest position.

9 Claims, 2 Drawing Sheets

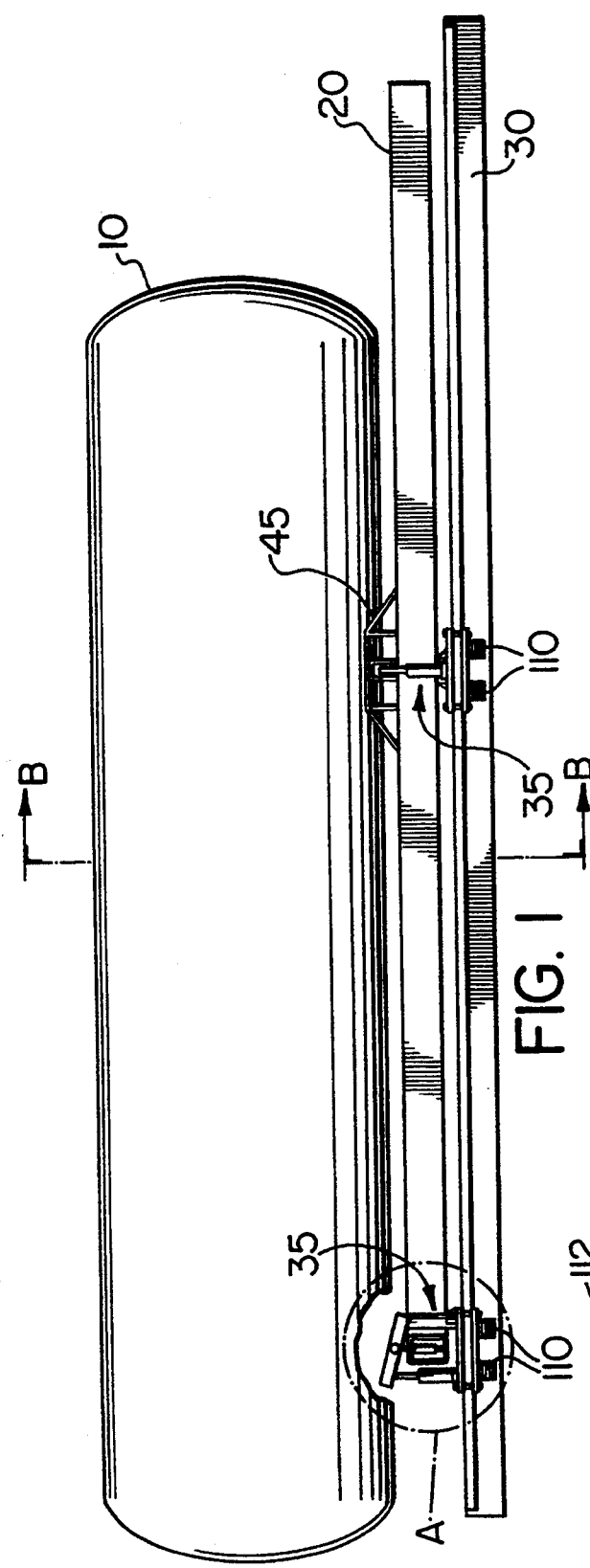
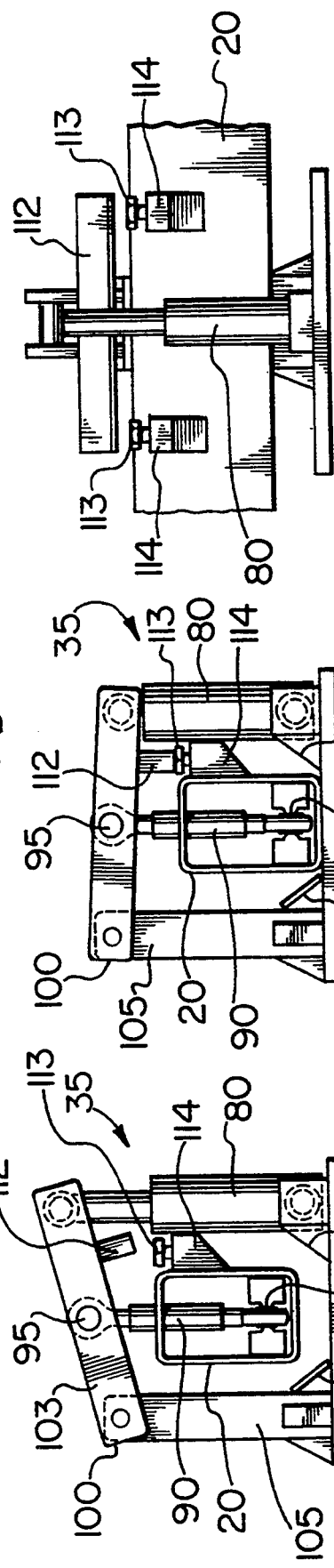
FIG. 1
FIG. 2a
FIG. 2b
FIG. 2c

MOBILE WEIGHING SYSTEM

FIELD OF THE INVENTION

The invention relates to weighing systems of the type used to weigh truck and trailer loads while the load is on the truck or trailer, that is, to mobile weighing systems.

BACKGROUND

Truck and trailer loads are frequently weighed during the course of transporting such loads. Typically this is done using weighing apparatus which operates while the load remains in position on the truck or trailer. Therefore, to be effective the weighing apparatus must be mobile and easy to use and install. It must also provide an accurate measurement of the weight of the load and be able to account for, or eliminate, certain factors which would affect the accuracy of the measurement such as an angled positioning of the load (e.g. if the truck or trailer rests upon uneven ground at the time the measurement is taken).

Many weighing systems are in use in the marketplace but none provide the ease of operation, convenient mobility and broad-based effectiveness of the present invention which is described and claimed herein.

SUMMARY OF THE INVENTION

The invention provides a mobile weighing system for mounting onto a truck or trailer to weigh a load carried by the truck or trailer. The weighing system includes a load support frame for supporting a load, a truck or trailer frame below the load support frame and, a plurality of weighing cells. Each weighing cell includes a lifting mechanism having an extended and a rest position, a vertically disposed tension load cell and a linkage assembly coupling together the lifting mechanism and the load cell to cause an upward force on a top end of the load cell when the lifting mechanism is in an extended position. The bottom end of the load cell is coupled to the support frame whereby the support frame is suspended by the load cells when the lifting mechanisms are extended. The weighing cells are mounted over the truck or trailer frame in such a manner as to bear an approximately even distribution of the load. The lifting mechanisms and linkage assemblies of the weighing cells are coupled to the truck or trailer frame.

In accordance with another aspect of the invention there is provided a weighing cell for use in a mobile weighing system, the weighing cell including a lifting mechanism having an extended and a rest position, a vertically disposed tension load cell which produces an output correlated to a tension load thereon and a linkage assembly. The linkage assembly couples together the lifting mechanism and the load cell to cause an upward force on a top end of the load cell when the lifting mechanism is in an extended position. The bottom end of the load cell is configured for coupling to a support frame such that the support frame is suspended by the load cell when the lifting mechanism is in an extended position.

Preferably, a lock down mechanism is associated with and integral to each weighing cell for securing the load when the lifting mechanisms are in a rest position.

In accordance with a further aspect of the invention there is provided a method of weighing a load carried by a support frame over a truck or trailer including the following steps: mounting a plurality of weighing cells, comprised according to the foregoing, above the support frame in such a manner as to bear an approximately even distribution of the load; coupling the lifting mechanisms and linkage assemblies of the weighing cells to the truck or trailer frame; coupling the bottom end of the load cells to the support frame; extending the lifting mechanisms; and, determining the outputs of the load cells.

This invention is described below with reference to the following drawings in which like numerals pertain to like elements throughout.

BRIEF DESCRIPTION OF THE DRAWINGS

FIG. 1 is a side view of a truck and load showing the installation of a mobile weighing system in accordance with the invention.

FIG. 2a is an enlarged, opposite side view of the weighing cell (A) shown in FIG. 1 showing the lifting mechanism in an extended position and also showing the lock down mechanism of the weighing cell (which is not shown in FIGS. 1, 3 or 4).

FIG. 2b illustrates the weighing cell shown in 2a but showing the lifting mechanism in a rest position and the lock down mechanism in its activated mode.

FIG. 2c illustrates an end view of the weighing cell of FIGS. 2a.

DETAILED DESCRIPTION OF A PREFERRED EMBODIMENT

Figure 3:
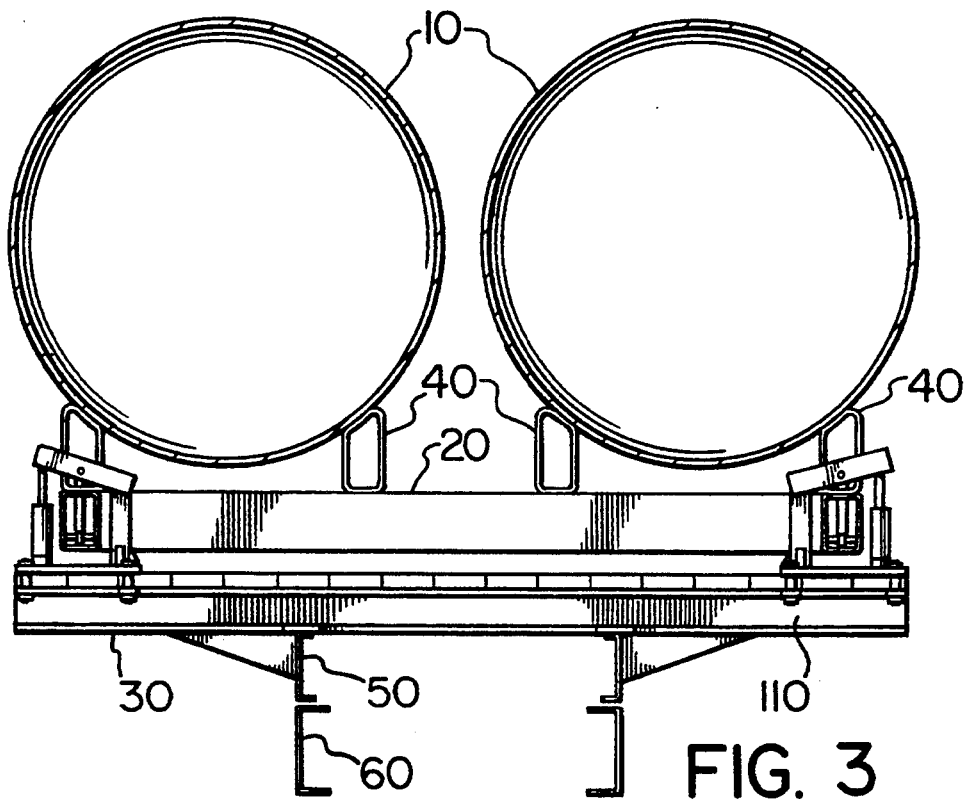
FIG. 3 is a sectional view of the truck and load of FIG. 1 taken at section B—B.
Figure 4:
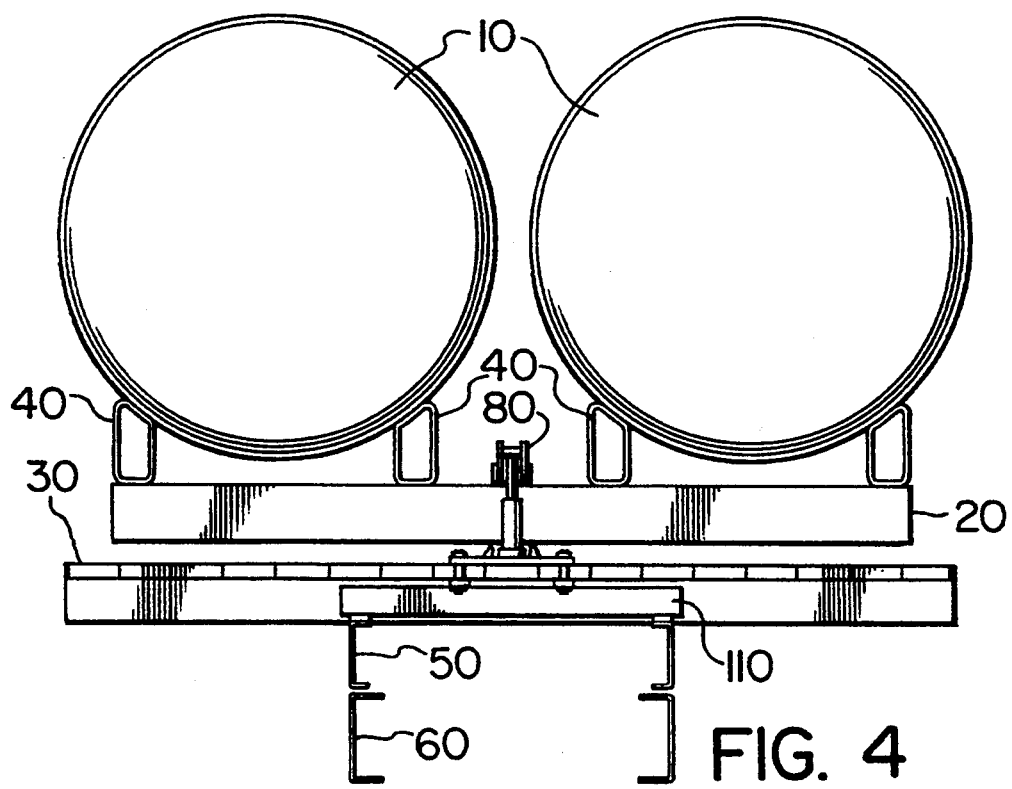
FIG. 4 is an end view of the truck and load of FIG. 1 showing the end of the weighing cell (A).

The preferred embodiment of the invention comprises three weighing cells 35 which are installed over the flat deck of a truck 30, 50 (or a trailer deck) at two side locations and one back location, as shown by the drawings, to provide a threepoint (triangular) suspension configuration. As known in the art a three-point suspension configuration is preferred as this provides approximately uniform loading over the weighing cells 35 regardless of any twisting of the truck trailer frame 60 and/or deck frame 50. Accordingly, each of the three weighing cells 35 bears about one third of the total load to be weighed by the subject weighing system. The total load consists of the load 10 which is desired to be weighed and the load contributed by the support frame 20. The weight of the support frame 20 is premeasured and is, therefore, a known constant for purposes of calculating the weight of the load 10 using the outputs of the weighing cells 35.

As shown in FIGS. 2a, 2b and 2c, each weighing cell 35 includes a lifting mechanism 80 having an extended and a rest position, being a double acting hydraulic cylinder in the preferred embodiment, a linkage assembly 100 comprising a stationary bar 105 and a cross-arm 103 pivotally attached thereto, a lock down mechanism 112,113 and 114, and a vertically disposed tension load cell 90, being an S-type tension cell. In the preferred embodiment for example product no. RL20000 manufactured by Rice Lake Weighing Systems of the U.S.A. The load cell 90 is installed within and attached to the support frame 20 at a bottom male rod end 93 of the load cell. The support frame 20 is made of 4 in. × 6 in. steel tubing which is appropriate to accommodate the load cell 90 and to provide sufficient strength to support the load 10 during the course of weighing the load. The load cell 90 is attached at an upper male rod end 95 to the cross-arm 103 of the linkage assembly. The rod ends 93, 95 of the load cell 90 are self-aligning and permit movement of the support frame 20 without angling the load cells 90. Therefore, the load cells 90 remain vertical during the weighing process irrespective of whether the truck frame and support frames 60, 20 may be unlevel. By remaining vertical, the load cells 90 are able to measure the true weight of the load. Both the stationary bar 105 of the linkage assembly and the lifting mechanism 80 are secured to the deck frame 50 (and, therefore, the truck frame 60) by means of transverse reinforcing bars 110 to which they are attached using appropriate hardware. The reinforcing bars 110 are made of 3 in.×3 in. steel tubing and are positioned underneath the deck 30 and welded to the deck frame 50.

To weigh the load 10 the load is lifted by extending the lifting mechanisms 80 (i.e. the arms of the hydraulic cylinders as shown in FIG. 2a) to an extended position. The load support brackets 40 and reinforcing brackets 45 stabilize the load during the lifting step as well as during transportation of the load. The extension of the arm of each hydraulic cylinder 80 causes the associated cross-arms 103 to pivot which in turn lifts the upper rod end 95 of the associated load cell 90 and the support frame 20 and load 10. This produces an upward force on the top ends of the load cells 90. At the same time, the support frame 20 and load 10 pull down on the load cells through the bottom rod ends 93 producing tensile forces in the load cells 90 which directly correlate to the weight of the load 10. As is well-known the load cells 90, when subject to tension, produce output voltage signals which correlate to the tension level of each cell. The voltage signals are added, amplified, digitized and calibrated according to conventional electronic methods (not shown) to produce a weight measurement for the load 10.

When the load is not being weighed the lifting mechanism 80 is returned to a rest position as shown by FIG. 2b at which time it pulls down on the cross-arm 103 a double acting hydraulic cylinder is used in order to provide this "pull down" operation). In this position the load cell 90 is not subject to any force and is loose within the support frame 20. The angled guides 85, 86 serve to align the support frame 20 into a central rest position as the lifting mechanism 80 is retracted and also serve to position the support frame 30 so that it doesn't slide horizontally. The lock down mechanism 112, 113, 114 couples the cross-arm 103 to the support frame 20 when the lifting mechanism 80 has retracted to a rest, lock down position. In the preferred embodiment shown the lock down mechanism consists of a lock down bar 112 extending below the cross-arm 113 which, in the lock down position, engages and pushes down onto two bolts 113 adjacent the support frame 20 and attached thereto by means of brackets 114.

The weighing step is performed simply and easily, essentially by the step of extending the lifting mechanism 80. Advantageously, it is only during this lifting step that the load cells 90 are subjected to tensile forces. When the measurement has been taken the lifting mechanisms 80 are returned to a rest (lock down) position (see FIG. 2b) and the load cells 90 are also returned to a rest (loose, non-tensile) state. Accordingly, the load cells 90 are subject to tension only when the load 10 is being weighed and are not subject to tension while the load 10 is being transported. This eliminates the possibility that the load cells 90 may be damaged during transportation by shock loading and thereby extends the life and reliability of the claimed weighing system.

Advantageously the combination of the linkage assembly 100, the lock down mechanism 112, 113, 114 and the lifting mechanism 80 provide an integral lock down system to effectively secure the combination of the load 10/support frame 20 when the load is not being weighed and during transportation.

What is claimed is:

1. A mobile weighing system for mounting onto a truck or trailer to weigh a load carried by said truck or trailers, said weighing system comprising:
    (a) a load support frame for supporting a load;
    (b) a truck or trailer frame below said load support frame; and,
    (c) a plurality of weighing cells, each said weighing cell comprising a lifting mechanism having an extended position and a rest position, a vertically disposed tension load cell and a linkage assembly coupling said lifting mechanism and said load cell to cause an upward force on a top end of said load cell when said lifting mechanism is in an extended position, the bottom end of said load cell being coupled to said support frame whereby said support frame is suspended by said load cells when said lifting mechanisms are in an extended position;
    whereby said weighing cells are mounted over said truck or trailer frame in such a manner as to bear an approximately even distribution of said load and said lifting mechanisms and linkage assemblies of said weighing cells are coupled to said truck or trailer frame.

2. A weighing system according to claim 1 wherein said linkage assembly comprises a stationary bar and a cross-arm pivotally attached thereto and said top end of said load cell is pivotally attached to said cross-arm whereby said load cell remains vertically disposed when said lifting mechanism is in an extended position.

3. A weighing system according to claim 2 comprising three said weighing cells.

4. A method of weighing a load carried by a support frame over a truck deck or trailer said method comprising the steps:
    (a) mounting a plurality of weighing cells comprised according to claim 3 over said support frame in such a manner that said weighing cells will bear an approximately even distribution of said load;
    (b) coupling said lifting mechanisms and linkage assemblies to said trailer frame;
    (c) coupling said bottom end of said load cells to said support frame;
    (d) extending said lifting mechanisms; and,
    (e) determining the outputs of said load cells.

5. A weighing system according to claim 3 comprising a lock down mechanism associated with and integral to each said weighing cell for securing said load when said lifting mechanisms are in a rest position.

6. A weighing system according to claim 5 wherein said lock down mechanism comprises means coupling the cross-arm of the associated weighing cell to said load support frame when the lifting mechanism of said associated weighing cell is in a rest position.

7. A weighing cell for use in a mobile weighing system, comprising a lifting mechanism having an extended and a rest position, a vertically disposed tension load cell which produces an output correlated to a tension load thereon and a linkage assembly whereby said linkage assembly couples said lifting mechanism and said load cell to cause an upward force on a top end of said load cell when said lifting mechanism is in an extended position, the bottom end of said load cell being configured for coupling to a load support frame such that said load support frame may be suspended by a plurality of said load cells when the lifting mechanisms thereof are in extended positions.

8. A weighing cell according to claim 7 wherein said linkage assembly comprises a stationary bar and a cross-arm pivotally attached thereto and said top end of said load cell is pivotally attached to said cross-arm whereby said load cell remains vertically disposed when said lifting mechanism is in an extended position.

9. A weighing cell according to claim 8 comprising a lock down mechanism integral to said weighing cell, said lock down mechanism comprising means coupling said cross-arm to said load support frame when said lifting mechanism is in a rest position.

* * * * *